United States Patent
Katoh et al.

(10) Patent No.: US 7,797,278 B2
(45) Date of Patent: Sep. 14, 2010

(54) MIGRATABLE BACKUP AND RESTORE

(75) Inventors: Hiroshi Katoh, Yamato (JP); Hirokazu Miyamori, Isehara (JP); Kei Watanabe, Tokyo (JP); Naoki Yamakoshi, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1332 days.

(21) Appl. No.: 10/861,857

(22) Filed: Jun. 4, 2004

(65) Prior Publication Data

US 2005/0010609 A1    Jan. 13, 2005

(30) Foreign Application Priority Data

Jun. 12, 2003    (JP) .............................. 2003-168398

(51) Int. Cl.
G06F 7/00 (2006.01)
G06F 17/00 (2006.01)

(52) U.S. Cl. ...................... 707/640; 707/674

(58) Field of Classification Search .................. None
See application file for complete search history.

(56) References Cited

U.S. PATENT DOCUMENTS

| | | | | | |
|---|---|---|---|---|---|
| 5,642,505 | A | * | 6/1997 | Fushimi ..................... | 707/204 |
| 5,956,733 | A | * | 9/1999 | Nakano et al. .............. | 707/204 |
| 6,598,134 | B2 | * | 7/2003 | Ofek et al. .................. | 711/162 |
| 6,847,984 | B1 | * | 1/2005 | Midgley et al. ............. | 707/204 |
| 7,222,233 | B1 | * | 5/2007 | Rubin ........................ | 713/168 |
| 7,330,997 | B1 | * | 2/2008 | Odom .......................... | 714/6 |
| 2001/0034737 | A1 | * | 10/2001 | Cane et al. .................. | 707/204 |
| 2002/0083085 | A1 | * | 6/2002 | Davis et al. ................. | 707/204 |
| 2002/0138504 | A1 | * | 9/2002 | Yano et al. .................. | 707/204 |
| 2003/0130984 | A1 | * | 7/2003 | Quinlan et al. ............. | 707/1 |
| 2003/0229653 | A1 | * | 12/2003 | Nakanishi et al. .......... | 707/200 |

(Continued)

FOREIGN PATENT DOCUMENTS

JP    2001-060175    3/2001

(Continued)

OTHER PUBLICATIONS

"PC Migration Services." http://www-6.ibm.com/jp/pc/service/migration.

Primary Examiner—Neveen Abel Jalil
Assistant Examiner—Raheem Hoffler
(74) Attorney, Agent, or Firm—Patrick J. Daugherty; Driggs, Hogg, Daugherty & Del Zoppo Co., LPA

(57) ABSTRACT

A backup system for backing up target data stored in an information processing device comprises a backup program stor for retaining a backup program, a read authentication information stor for retaining read authentication information, a backup function sender which transfers the backup program and the read authentication information to the device, and a data stor which retains the target data to be transferred to the backup system by the device which has executed the backup program, wherein the backup program is invoke-able on the device by a user of the device, and comprises a read authentication mechanism for obtaining permission to read the target data from the device by causing the read authentication information to be authenticated, and a transfer mechanism for causing the device to read the target data and transfer the target data to the backup system.

16 Claims, 9 Drawing Sheets

U.S. PATENT DOCUMENTS

2004/0083245 A1* 4/2004 Beeler, Jr. .................. 707/204
2004/0107199 A1* 6/2004 Dalrymple et al. .......... 707/100
2004/0254964 A1* 12/2004 Kodama et al. ............. 707/204
2005/0021566 A1* 1/2005 Mu ............................ 707/200

FOREIGN PATENT DOCUMENTS

| JP | 2002-049534 | 2/2002 |
| JP | 2002-222106 | 8/2002 |
| JP | 2002-358245 | 12/2002 |

* cited by examiner

250

| 1 | DEVICE ID | A | B | | Z |
|---|---|---|---|---|---|
| 2 | DOMAIN NAME | $A_1$ | $B_1$ | | $Z_1$ |
| 3 | READ AUTHENTICATION INFORMATION | $A_2$ | $B_2$ | | $Z_2$ |
| 4 | DOWNLOAD COMMUNICATION METHOD | $A_3$(SHARED) | $B_3$(FTP) | | $Z_3$(SHARED) |
| 5 | SHARED DIRECTORY (FOR DOWNLOAD) | $A_4$ | — | | $Z_4$ |
| 6 | SHARED DIRECTORY AUTHENTICATION INFORMATION (DOWNLOAD AUTHENTICATION INFORMATION) | $A_5$ | — | | $Z_5$ |
| 7 | FTP HOST NAME (FOR DOWNLOAD) | — | $B_7$ | | — |
| 8 | FTP AUTHENTICATION INFORMATION (DOWNLOAD AUTHENTICATION INFORMATION) | — | $B_8$ | | — |
| 9 | BACKUP COMMUNICATION METHOD | $A_9$(SHARED) | $B_9$(FTP) | | $A_9$(FTP) |
| 10 | SHARED DIRECTORY (FOR BACKUP) | $A_{10}$ | — | | — |
| 11 | SHARED DIRECTORY AUTHENTICATION INFORMATION (BACKUP DESTINATION AUTHENTICATION INFORMATION) | $A_{11}$ | — | | — |
| 12 | FTP HOST NAME (FOR BACKUP) | — | $B_{12}$ | | $Z_{12}$ |
| 13 | FTP AUTHENTICATION INFORMATION (BACKUP DESTINATION AUTHENTICATION INFORMATION) | — | $B_{13}$ | | $Z_{13}$ |

FIG. 3

MIGRATABLE BACKUP AND RESTORE

BACKGROUND OF THE INVENTION

The present invention relates to a backup system, a backup method, a backup program, a restore system, a restore method, a restore program, a migration system, a migration method, and a recording medium on which the backup program or the restore program is recorded. Particularly, the present invention relates to a backup system, a backup method, a backup program, a restore system, a restore method, a restore program, a migration system, a migration method, and a recording medium on which the backup program or the restore program is recorded, wherein if an information processing device included in an information system is replaced, for example, data stored in the information processing device can be quickly migrated to a new information processing device.

In a conventional information system provided in an enterprise or the like, when an information processing device such as a personal computer is replaced, an operation staff member of an information system managing department visits a place where the information processing device is installed, and migrates data such as files and preferences stored in the information processing device to a new information processing device (see Non-Patent Document 1).

[Non-Patent Document 1]
IBM Japan, "PC Migration Service" [online] [retrieved on May 28, 2003], Internet http://www-6.ibm.com/jp/pc/service/migration If the operation described above is performed to replace the information processing device, the management cost of the information system increases considerably. Furthermore, during the replacement of the information processing device, the operation staff member must perform the operation by occupying the information processing device to be replaced so that a user of the information processing device cannot use this information processing device during the migration, which leads to lowering of user's operational efficiency.

SUMMARY OF THE INVENTION

It is thus a purpose of the present invention to provide a backup system, a backup method, a backup program, a restore system, a restore method, a restore program, a migration system, a migration method, and a recording medium on which the backup program or the restore program is recorded, which solves the above problems.

According to a first aspect of the present invention, a backup system for backing up target data stored in an information processing device is provided, which comprises a backup program storing section for storing a backup program to be executed on the information processing device to transfer the target data to the backup system, a read authentication information storing section for storing read authentication information for causing the information processing device to permit reading of the target data by the backup program, a backup function sending section for sending the backup program and the read authentication information to the information processing device, and a data storing section for storing the target data to be transferred to the backup system by the information processing device which has executed the backup program, wherein the backup program is invoked on the information processing device by a user of the information processing device, and the backup program comprises read authentication means for obtaining permission to read the target data from the information processing device by causing the information processing device to authenticate the read authentication information sent to the information processing device, and transfer means for causing the information processing device to read the target data permitted to be read and transfer the target data to the backup system. The first aspect also provides a backup method and a backup program for the backup system, and a recording medium on which the backup program is recorded.

According to a second aspect of the present invention, a restore system for restoring target data in an information processing device is provided, which comprises a restore program storing section for storing a restore program to be executed on the information processing device to cause the information processing device to store the target data received from the restore system, a write authentication information storing section for storing write authentication information for causing the information processing device to permit writing of the target data by the restore program, a restore function sending section for sending the restore program and the write authentication information to the information processing device, and a target data sending section for sending the target data to the information processing device which has executed the restore program, wherein the restore program is invoked on the information processing device by a user of the information processing device, and the restore program comprises write authentication means for obtaining permission to write the target data in the information processing device by causing the information processing device to authenticate the write authentication information sent to the information processing device, and target data storing means for causing the information processing device to store the target data received from the target data sending section. The second aspect also provides a restore method and a restore program for the restore system, and a recording medium on which the restore program is recorded.

BRIEF DESCRIPTION OF THE DRAWINGS

Some of the purposes of the invention having been stated, others will appear as the description proceeds, when taken in connection with the accompanying drawings, in which:

FIG. 3 shows, in a table form, a data structure of an authentication information file 250 according to the embodiment of the present invention;

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, in which like numerals indicate like elements or steps throughout the several views, a preferred embodiment of the present invention will be described.

Figure 1:
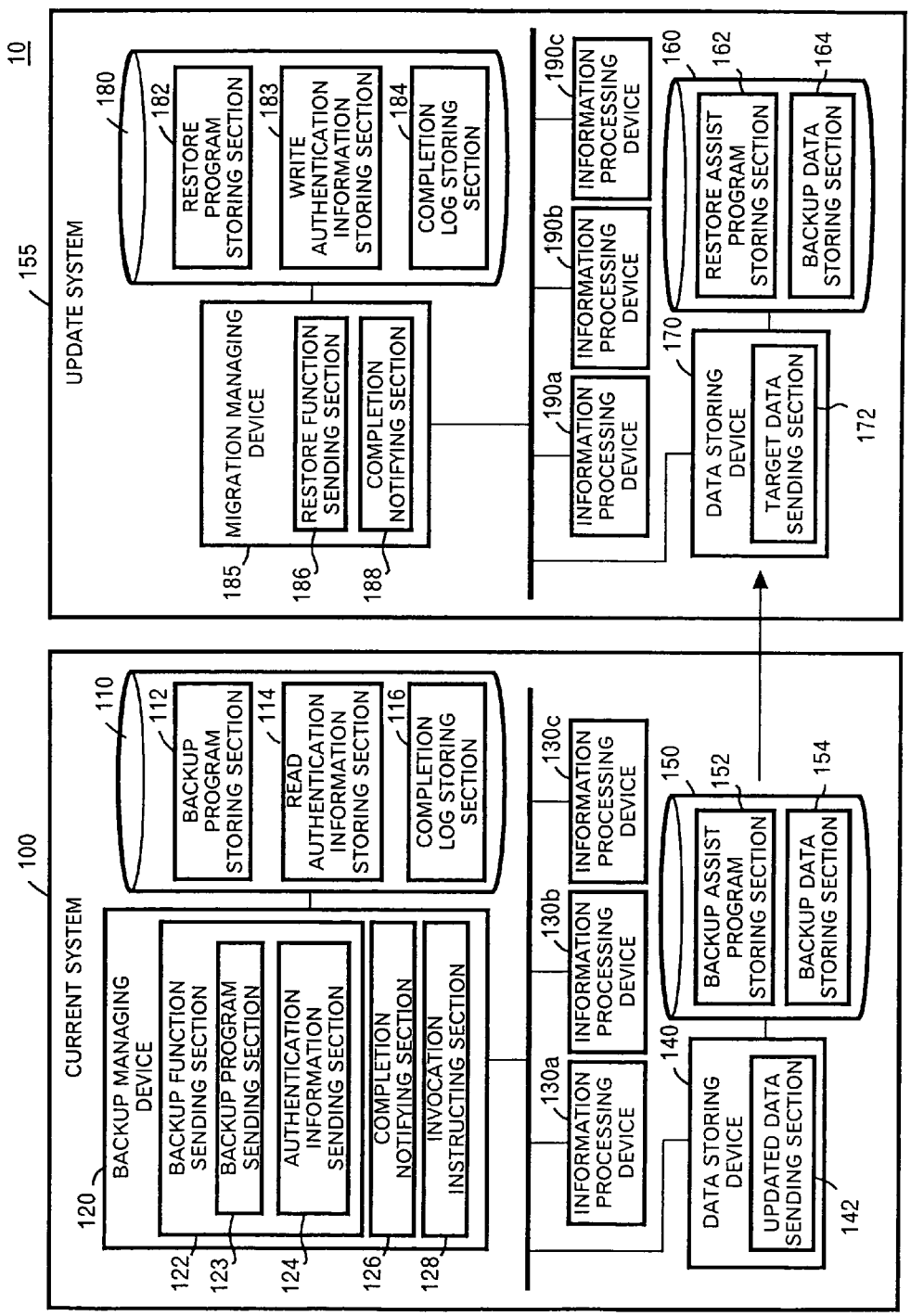
FIG. 1 shows an exemplary configuration of an information system 10 according to an embodiment of the present invention.

FIG. 1 shows an exemplary configuration of an information system 10 according to the present embodiment. The information system 10 comprises a current system 100 having information processing devices 130 used for normal applications, and a update system 155 having information processing devices 190. When the information processing devices 130 in the current system 100 are to be replaced, the update system 155 sets up the information processing devices 190 to be newly used, prior to the replacement. More specifically, when the information processing devices 130 are replaced with and migrated to the new information processing devices 190, target data to be migrated is backed in the current system 100 in advance, and the backed up target data is restored in the information processing devices 190 in the update system 155. Subsequently, the new information processing devices 190 are delivered to the department where the old information processing devices 130 are located, and the old information processing devices 130 are replaced with the new information processing devices 190. As a result, it is possible to reduce the management cost required to replace the information processing devices 130 with the information processing devices 190, as well as the down time of the information processing devices.

The current system 100 has a storage device 110, a backup managing device 120 connected to the storage device 110, information processing devices 130a to 130c used for normal applications, a data storing device 140, and a storage device 150. The storage device 110, the backup managing device 120, the data storing device 140, and the storage device 150 cooperate as a backup system which is a computer system for backing up target data stored in the information processing devices 130. Furthermore, the data storing device 140 and the storage device 150 as well as a storage device 160 and a data storing device 170 in the update system 155 are examples of a data storing section according to the present invention.

The storage device 110 includes a backup program storing section (program stor) 112, a read authentication information storing section (read authentication stor) 114, and a completion log storing section 116. The backup program storing section 112 stores a backup program executed on an information processing devices 130 to be replaced. The backup program transfers, to the data storing device 140, target data stored in the information processing device 130 concerned and to be migrated to a new information processing devices 190.

The read authentication information storing section 114 stores read authentication information for causing the information processing devices 130 concerned to permit the backup program to read the target data. The read authentication information may be, for example, an administrator login name and an administrator password for the information processing device 130 concerned or a backup administrator login name and a backup administrator password for the information processing device 130 concerned. The read authentication information may be the one used by a program executed on the information processing device 130 concerned to acquire an administrator authority or a backup administrator authority from the information processing device 130 concerned.

More specifically, the read authentication information storing section 114 according to the present embodiment stores an authentication information file which associates a device ID identifying each of a plurality of information processing devices 130 with the read authentication information for each information processing device 130. In this case, the device ID may be a computer name set on an operating system such as WINDOWS®, or a host name or IP address of the information processing device 130 concerned. The read authentication information storing section 114 may also store backup destination authentication information in association with the device ID identifying each of the plurality of information processing device 130 in which the backup destination authentication information causes the data storing device 140 to permit each information processing device 130 to store target data.

The completion log storing section 116 stores completion log information indicating that a backup process has been completed when a backup process for an information processing device 130 to be backed up has been completed.

The backup managing device 120 is operated by an administrator of the information system 10 or the current system 100 and used to remotely control the backup processing for the information processing devices 130. The backup managing device 120 includes a backup function sending section (backup function sender) 122, a completion notifying section (completion notifier) 126, and an invocation instructing section (invocation instructor) 128. The backup function sending section 122 includes a backup program sending section 123 for sending the backup program stored in the backup program storing section 112 to each information processing device 130 to be backed up and an authentication information sending section 124 for sending the read authentication information and/or backup destination authentication information stored in the read authentication information storing section 114 to the information processing device 130 to be backed up. If a plurality of information processing devices 130 are to perform the backup processing, the backup function sending section 122 sends the backup program and the authentication information file stored in the read authentication information storing section 114 to each of the plurality of information processing devices 130.

Once the information processing device 130 completes backing up its target data, the completion notifying section 126 notifies the administrator of the information system 10 or the current system 100 that the target data has been completely backed up. In this case, if the administrator of the information system 10 or the current system 100 instructs a plurality of information processing devices 130 to perform the backup processing, the completion notifying section 126 notifies the administrator of the information system 10 or the current system 100 that all of the plurality of information processing devices 130 have completely backed up their target data.

The data storing device 140 receives the target data transferred thereto by the information processing device 130 which has executed the backup program, and stores the target data in the backup data storing section (data stor) 154 in the storage device 150. Additionally, if the target data of the information processing device 130 is updated on this information processing device 130 after it has been transferred to the data storing device 140, the data storing device 140 receives updated data which is a updated portion of the target data from the information processing device 130, and stores the updated data in the backup data storing section 154 in the storage device 150. The data storing device 140 includes a updated data sending section 142 which receives a request from an information processing device 190 replacing the information processing device 130 concerned and sends the updated data to that information processing device 190 to update the target data stored therein. In this case, the information processing device 190 may update the already stored target data by overwriting the target data with the updated data.

The storage device 150 includes a backup assist program storing section 152 for storing a backup assist program which is downloaded into an information processing device 130 by the backup program executed on that information processing device 130, to perform a portion of the backup processing, and a backup data storing section 154 for storing the target data and updated data transferred from the information processing device 130 via the data storing device 140.

The update system 155 has a storage device 180, a migration managing device 185 connected to the storage device 180, a storage device 160, a data storing device 170 connected to the storage device 160, and information processing devices 190a to 190c which are to replace the information processing devices 130a to 130c, respectively. The storage device 160, the data storing device 170, the storage device 180, and the migration managing device 185 cooperate as a restore system which is a computer system which acquires target data backed up from the information processing devices 130 in the current system 100 and restores the target data in the new information processing device 190 replacing the information processing device 130 which has stored the target data. The backup system and the restore system cooperate as a migration system which is a computer system which migrates the target data backed up from the information processing device 130 to the information processing device 190. The data storing device 170 and the storage device 180 may operate as a portion of the backup system.

The storage device 180 includes a restore program storing section (restore program stor) 182, a write authentication information storing section (write authentication stor) 183, and a completion log storing section 184. The restore program storing section 182 stores a restore program executed on the information processing device 190 replacing the information processing device 130. The restore program causes the target data acquired from the storage device 150 and stored in the backup data storing section 164 in the storage device 160 to be stored in the information processing device 190.

The write authentication information storing section 183 stores write authentication information for causing the information processing device 190 concerned to permit the restore program to write the target data in that information processing device 190. The write authentication information may be, for example, an administrator login name and an administrator password for the information processing device 190 concerned, or a backup administrator login name and a backup administrator password for the information processing device 190 concerned. The write authentication information may be the one used by a program executed on the information processing device 190 concerned to acquire an administrator authority or a backup administrator authority from the information processing device 190 concerned.

More specifically, the write authentication information storing section 183 according to the present embodiment stores an authentication information file which associates a device ID identifying each of a plurality of information processing devices 130 with the write authentication information of that information processing device 190 replacing an information processing device 130.

The completion log storing section 184 stores completion log information indicating that a restore operation has been completed when the target data has been completely restored to the information processing devices 190.

The migration managing device 185 is operated by an administrator of the information system 10 or the update system 155 and used to remotely control the restore processing for the information processing devices 190. The migration managing device 185 includes a restore function sending section 186 and a completion notifying section 188. The restore function sending section 186 sends, to each information processing device 190 intended for restoring, the restore program stored in the restore program storing section 182 and the write authentication information and/or restore authentication information stored in the write authentication information storing section 183. Once the information processing device 190 completes restoring the target data, the completion notifying section 188 notifies the information system 10 or the update system 155 that the target data has been completely restored. In this case, if the administrator of the information system 10 or the update system 155 instructs a plurality of information processing devices 190 to perform the restore processing, the completion notifying section 188 notifies the administrator of the information system 10 or the update system 155 that the target data has been completely restored to all of the plurality of information processing devices 190.

The storage device 160 includes a restore assist program storing section 162 for storing a restore assist program that is downloaded into the information processing device 190 by the restore program executed on the information processing device 190, to execute a section of a restore process, and a backup data storing section 164 for storing the target data acquired from the storage device 150 via the data storing device 170.

The data storing device 170 acquires target data of an information processing device 130 to be replaced from the storage device 150 and stores it in the backup data storing section 164 in the storage device 160. The data storing device 170 includes a target data sending section (target data sender) 172. The target data sending section 172 receives a request from the restore program executed on an information processing device 190 replacing the information processing device 130 concerned, to select the target data acquired from the information processing device 130 concerned on the basis of the device ID received from the information processing device 190 concerned. The target data sending section 172 sends the selected target data to the information processing device 190 which then stores the target data.

According to the information system 10 described above, when an information processing device 130 in the current system 100 is replaced and migrated to a new information processing device 190, target data for migration stored in the information processing device 130 may be migrated to the information processing device 190 before the information processing device 130 is replaced with the information processing device 190, so that management cost for the replacement and downtime of the information processing device can be reduced.

In the above, the current system 100 may be used, for example, in an enterprise or at home, and the update system 155 may be provided in a manufacturer which delivers information processing devices to, for example, enterprises or homes. In this case, the manufacturer may use the update system 155 to migrate the target data stored in the information processing device 130 to the information processing device 190 before delivering the information processing device 190 to an enterprise or home.

Alternatively, the current system 100 may be the one in which the information processing device 130 provided therein is used for, for example, normal applications for an enterprise, and the update system 155 may be the one provided in an information system department to migrate target data to an information processing device delivered to the current system 100 as the number of employees in the enterprise increases or decreases, or department organization of the enterprise changes.

Figure 2:
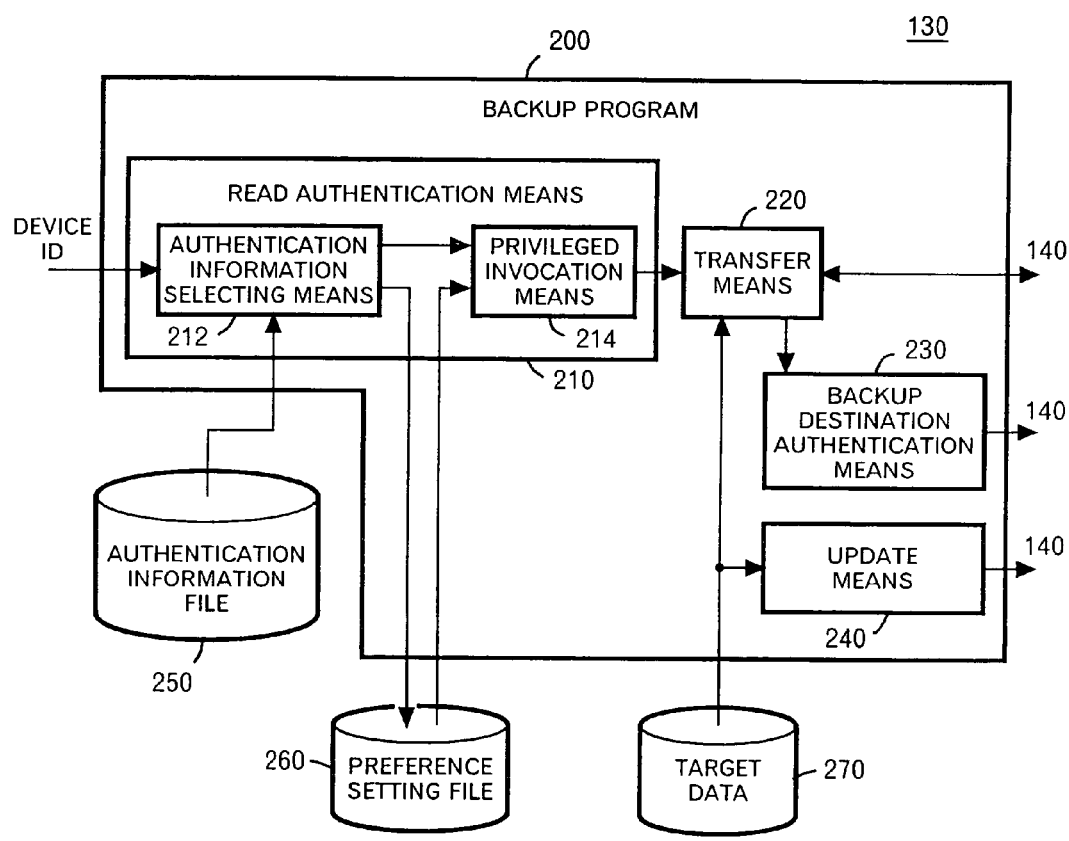
FIG. 2 shows a functional configuration of a backup program 200 executed on an information processing device 130 according to the embodiment of the present invention.

FIG. 2 shows a functional configuration of a backup program 200 executed on an information processing device 130 according to the present embodiment. If one or more information processing devices 130 are to be replaced with information processing devices 190, the administrator of the information system 10 or the current system 100 instructs the backup managing device 120 to perform backup processing for the information processing devices 130. Upon receiving the instruction to back up, the backup managing device 120 sends, to each of the one or more information processing devices 130, the backup program 200 stored in the backup program storing section 112, and an authentication information file 250 containing read authentication information of each of the one or more information processing devices 130 stored in the read authentication information storing section 114. In this case, the backup function sending section 122 in the backup managing device 120 may send the backup program 20 and authentication information file 250 to each of the one or more information processing devices 130 as an archive file in an executable form.

The backup program 200 sent to each information processing device 130 is invoked on that information processing device 130 by its user. In this case, if the backup program 200 and the authentication information file 250 are sent as an archive file, the user of the information processing device 130 may invoke the archive file to invoke the backup program 200. That is, when the archive file is executed on each information processing device 130, it is expanded to the backup program 200 and the authentication information file 250, and the backup program 200 is then executed.

The backup program 200 has read authentication means (read authentication code) 210, transfer means (transfer code) 220, backup destination authentication means (backup destination code) 230, and update means (update code) 240.

The read authentication means 210 causes the information processing device 130 concerned to authenticate the read authentication information sent to the information processing device 130 so as to obtain permission to read target data 270 from the information processing device 130. The read authentication means 210 includes authentication information selecting means 212 and a privileged invocation means 214. The authentication information selecting means 212 stores, in a preference setting file 260, read identification information and/or backup destination identification information corresponding to the information processing device 130 concerned among those corresponding to the respective information processing devices 130 stored in the authentication information file 250. More specifically, the authentication information selecting means 212 acquires the device ID of the information processing device 130 concerned therefrom, selects, from the authentication information file 250, read identification information and other information associated with a device ID matching the device ID set for the information processing device 130 concerned among a plurality of device Ids contained in the authentication information file 250, and then stores such information in the preference setting file 260 as preference required to run the backup program 200 on the information processing device 130 concerned.

The privileged invocation means 214 acquires the read identification information selected by the authentication information selecting means 212, from the preference setting file 260, and cause the information processing device 130 to authenticate the read identification information to obtain permission to read the target data 270 by the backup program 200 from the information processing device 130. In the present embodiment, the privileged invocation means 214 obtains permission to read the target data 270 by the transfer means by causing the information processing device 130 to authenticate the read identification information such as an administrator login name and an administrator password, or a backup administrator login name and a backup administrator password, and invoking the transfer means 220 in a privilege mode.

The transfer means 220 causes the information processing device 130 to read the target data 270 for which the permission to read has been obtained by the read authenticating means 210, and transfer the target data 270 to the data storing device 140. If the backup destination identification information corresponding to the information processing device 130 is stored in the preference setting file 260, the transfer means 220 supplies the backup destination identification information to the backup destination authentication means 230 before transferring the target data 270 to the data storing device 140.

In the above, the transfer means 220 may download the backup assist program stored in the backup assist program storing section 152, into the information processing device 130 via the data storing device 140 so that the backup assist program can take charge of a portion of the backup processing described above.

Upon receiving the backup destination identification information from the transfer means 220, the backup destination authentication means 230 obtains permission to store the target data 270 in the storage device 150 by sending the backup destination identification information to the data storing device 140 to cause it to be authenticated.

If the target data 270 is updated on the information processing device 130 after it was transferred to the data storing device 140 by the transfer means 220, the update means 240 causes the information processing device 130 to read and transfer the updated target data 270 to the data storing device 140.

In the above, the target data 270 may include data such as files created by the user of the information processing device 130, contents of a registry of the operating system executed on the information processing device 130, and/or customize data created by the user of the information processing device 130 by customizing various programs executed on the information processing device 130. The target data 270 may also include drive images of a hard disk drive and/or other drives provided in the information processing device 130.

FIG. 3 shows, in a table form, a data structure of the authentication information file 250 according to the present embodiment. In the authentication information file 250 according to the present embodiment, the following information is recorded for each of the one or more information processing devices 130 in association with the device ID identifying the information processing device 130 concerned: "domain name", "read authentication information", "download communication method", "shared directory (for download)", "shared directory authentication information (download authentication information)", "FTP host name (for download)", "FTP authentication information (download authentication information)", "backup communication method", "shared directory (for backup)", "shared directory authentication information (backup destination authentication information)", "FTP host name (for backup)", and "FTP authentication information (backup destination authentication information)".

The "download communication method" specifies a communication method used by the backup program 200, executed on the information processing device 130, to download the backup assist program into the information processing device 130. In the present embodiment, the authentication information file 250 can specify, as a download communication method, either a method of acquiring the backup assist program from the backup assist program storing section 152 provided as a shared directory, or a method of acquiring the backup assist program from the data storing device 140 using an FTP.

If the shared directory-based method is specified as a download communication method, the backup program 200 obtains permission to read the share directory from the data storing device 140 using the authentication information set in the "shared directory authentication information (download authentication information)", and then acquires the backup assist program from the shared directory specified in the "shared directory (for download)".

If the FTP-based method is specified as a download communication method, the backup program 200 makes an FTP request to a host (for example, the data storing device 140) specified in the "FTP host name (for download)" using the authentication information set in the "FTP authentication information (download authentication information)" so as to acquire the backup assist program using the FTP.

The "backup communication method" specifies a communication method used by the transfer means 220 in the backup program 200, executed on the information processing device 130, to transfer the target data to the data storing device 140. In the present embodiment, the authentication information file 250 can specify, as a backup communication method, either a method of storing the target data in the backup data storing section 154 provided as a shared directory, or a method of transferring the target data to the data storing device 140 using the FTP.

If the shared directory-based method is specified as a backup communication method, the backup program 200 obtains permission to write the target data from the data storing device 140 using the authentication information set in the "shared directory authentication information (backup destination authentication information)", and then backs up the target data in the shared directory specified in the "shared directory (for backup)".

If the FTP-based method is specified as a backup communication method, the backup program 200 makes an FTP request to the host (for example, the data storing device 140) specified in the "FTP host name (for backup)" using the authentication information set in the "FTP authentication information (backup destination authentication information)" so as to store the target data in the host using the FTP.

As described above, the authentication information file 250 allows different communication methods and different pieces of read authentication information, download authentication information, and backup destination authentication information to be specified for the one or more information processing devices 130, respectively. The authentication information selecting means 212 uses the device ID set for the information processing device 130 in which the backup program 200 is to be executed, to store, in the preference setting file 260, a domain name, read authentication information, download communication method, shared directory (for download), shared directory authentication information (download authentication information), FTP host name (for download), FTP authentication information (download authentication information), backup communication method, shared directory (for backup), shared directory authentication information (backup destination authentication information), FTP host name (for backup), and FTP authentication information (backup destination authentication information) corresponding to that device ID. The privileged invocation means 214, the transfer means 220, the backup destination authentication means 230, and the update means 240 can perform the backup processing based on such information.

Figure 4:
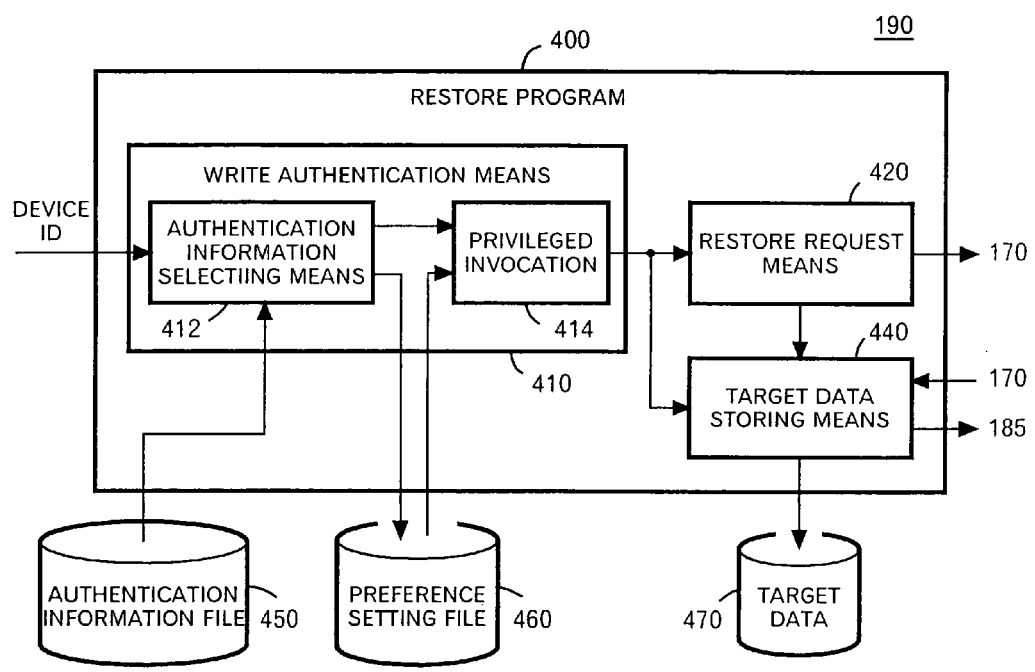
FIG. 4 shows a functional configuration of a restore program 400 executed on an information processing device 190 according to the embodiment of the present invention.

FIG. 4 shows a functional configuration of a restore program 400 executed on the information processing device 190 according to the present embodiment. When the target data stored in one or more information processing devices 130 has been backed up in the backup data storing section 154 in the storage device 150 and then transferred to the backup data storing section 164, the administrator of the information system 10 or the update system 155 instructs the migration managing device 185 to restore the target data stored in each of the one or more information processing devices 130, in the information processing device 190 replacing that information processing device 130. Upon receiving the restore instruction, the migration managing device 185 sends, to each of the one or more information processing devices 190, the restore program 400 stored in the restore program storing section 182, and an authentication information file 450 stored in the write authentication information storing section 183 which contains the write authentication information of each of the one or more information processing devices 190. The restore function sending section 186 may send the restore program 400 and the authentication information file 450 to each of the one or more information processing devices 190 as an archive file in an executable form.

The restore program 400 sent to each information processing device 190 is invoked on that information processing device 190 by the administrator who sets that information processing device 190. If the restore program 400 and the authentication information file 450 have been received as an archive file, the administrator of the information processing device 190 may invoke the restore program 400 by executing the archive file. That is, when the archive file is executed on each information processing device 190, it is expanded to the restore program 400 and the authentication information file 450, and the restore program 400 is then executed.

The restore program 400 has write authentication means (write authentication code) 410, restore request means (restore request code) 420, and target data storing means (target data storing code) 440.

The write authentication means 410 obtains permission to write, in the information processing device 190 concerned, the target data of the information processing device 130 backed up in the backup data storing section 164 by causing the information processing device 190 concerned to authenticate the write authentication information sent thereto. The write authentication means 410 includes authentication information selecting means 412 and privileged invocation means 414. The authentication information selecting means 412 stores, in a preference setting file 460, write identification information and other information corresponding to the information processing device 190 concerned among those corresponding to the plurality of information processing devices 190, respectively, stored in the authentication information file 450.

More specifically, in the authentication information file 450, "write authentication information" is recorded in place of the "read authentication information" in FIG. 3, and "restore communication method", "shared directory (for restore)", "shared directory authentication information (restore target authentication information)", "FTP host name (for restore)", and "FTP authentication information (restore target authentication information)" are recorded in place of the "backup communication method", "shared directory (for backup)", "shared directory authentication information (backup destination authentication information)", "FTP host name (for backup)", and "FTP authentication information (backup destination authentication information)".

The "restore communication method" specifies a communication method used by the restore program 400, executed on the information processing device 190, to receive the target data from the data storing device 170. In the present embodiment, the authentication information file 450 can specify, as a restore communication method, either a method of storing the target data in the backup data storing section 164 provided as a shared directory, or a method of receiving the target data from the data storing device 170 using the FTP.

If the shared directory-based method is specified as a restore communication method, the restore program 400 uses the authentication information set in the "shared directory authentication information (restore target authentication information)" to obtain permission to read the target data from the data storing device 170, and then receives the target data from the shared directory specified in the "shared directory (for restore)".

If the FTP-based method is specified as a restore communication method, the restore program 400 makes an FTP request to the host specified in the "FTP host name (for restore)" (for example, the data storing device 170) using the authentication information set in the "FTP authentication information (restore target authentication information) so as to cause the target data to be received from the host using the FTP.

Furthermore, in the authentication information file 450, "download communication method", "shared directory (for download)", "shared directory authentication information (download authentication information)", "FTP host name (for download)", and "FTP authentication information (download authentication information)" are recorded similarly to such information in the authentication information file 250 so as to be used to download the restore assist program.

Additionally, each of the one or more information processing devices 190 is given the same device ID as that of the information processing device 130 to be replaced with that information processing device 190. The authentication information selecting means 412 acquires the device ID of the information processing device 190 concerned from the information processing device 190 itself, selects, from the authentication information file 450, write identification information and other information associated with a device ID matching the device ID set in the information processing device 190 concerned among a plurality of device Ids contained in the authentication information file 450, and then stores such information in the preference setting file 460 as preference required to run the restore program 400 on that information processing device 190.

The privileged invocation means 414 obtains permission to write the target data in target data 470 by the restore program 400, by acquiring the write identification information selected by the authentication information selecting means 412, from the preference setting file 460, and causing the information processing device 190 to authenticate the write identification information. In the present embodiment, the privileged invocation means 414 obtains permission to write in the target data 470 by the target data storing means 440, by causing the information processing device 190 to authenticate the write identification information such as the administrator login name and administrator password, or the backup administrator login name and backup administrator password, and invoking the restore request means 420 and the target data storing means 440 in the privilege mode.

The restore request means 420 receives the "restore communication method", "shared directory (for restore)", "shared directory authentication information (restore authentication information)", "FTP host name (for restore)", "FTP authentication information (restore authentication information), etc. associated with the device ID of the information processing device 190 concerned from the preference setting file 460 via the privileged invocation means 414, and requests the data storing device 170 to send the target data acquired from the information processing device 130 to be replaced with the information processing device 190 concerned.

The target data storing means 440 receives the target data sent from the target data sending section 172 in the data storing device 170 in response to the request made by the restore request means 420, and stores the received target data in the information processing device 190 for restore. More specifically, the target data storing means 440 restores the target data received from the target data sending section 172 so that the target data can be used on the information processing device 190 in the same manner as the information processing device 130.

Figure 5:
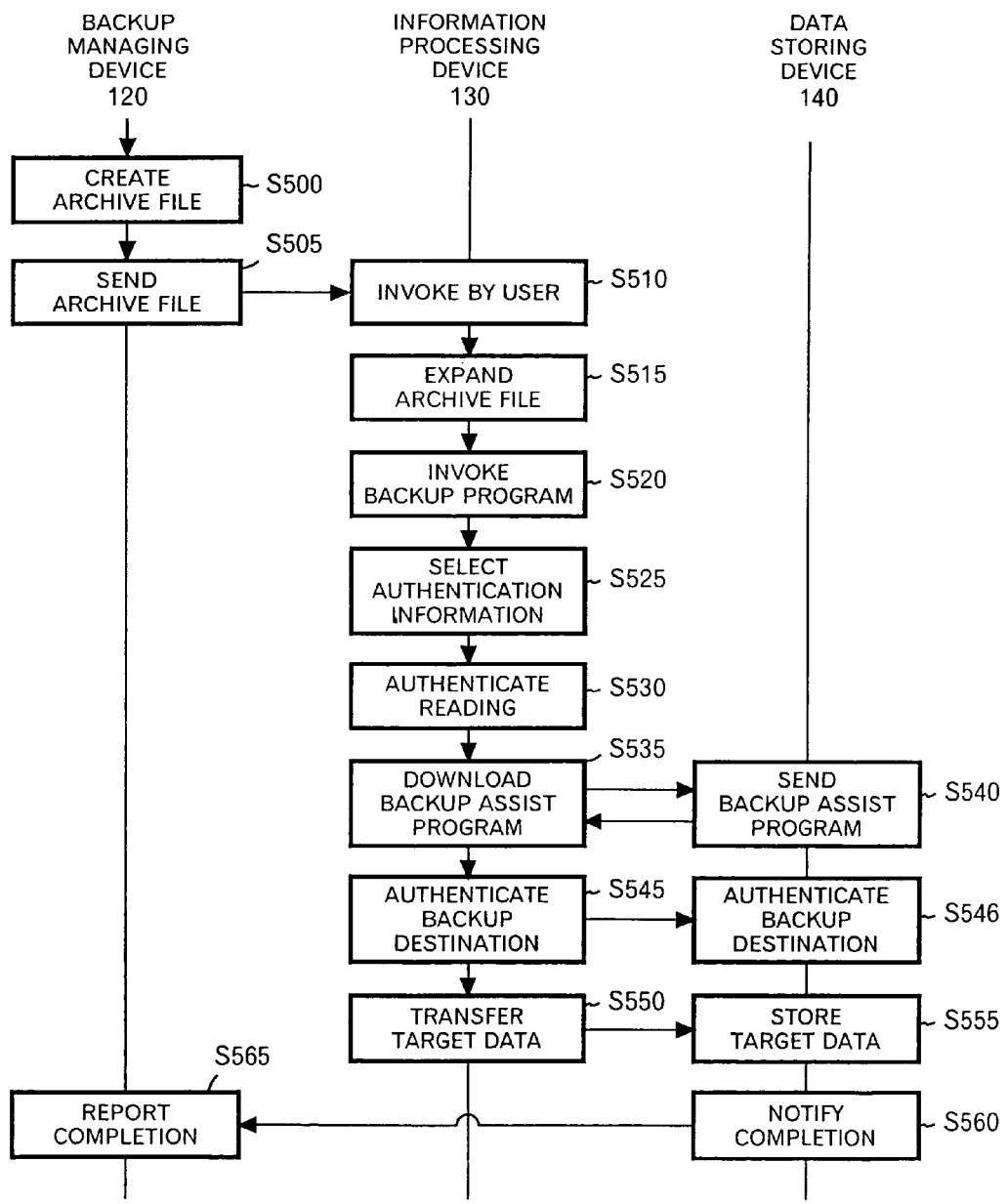
FIG. 5 shows a flow of backup processing in a current system 100 according to the embodiment of the present invention.

FIG. 5 shows a flow of the backup processing in the current system 100 according to the present embodiment.

First, the administrator of the information system 10 or the current system 100 stores the backup program in the backup program storing section 112, creates the authentication information file 250, and stores it in the read authentication information storing section 114. The administrator then instructs the backup managing device 120 to back up one or more information processing devices 130 to be replaced. Upon receiving the backup instruction, the backup function sending section 122 creates an archive file containing the backup program and the authentication information file (S500), and then sends the archive file to each of the one or more information processing devices 130 to be replaced (S505). The backup function sending section 122 may send the archive file by mail or the like. Alternatively, the backup program storing section 112 and the read authentication information storing section 114 may be used as a shared directory which can be accessed by the users of the information processing devices 130, and the backup program may be sent to the information processing device 130 when the user thereof instructs invocation of the backup program.

The archive file sent to each information processing device 130 is invoked on that information processing device 130 by its user (S510). Next, the information processing device 130 expands the archive file to the backup program 200 and the authentication information file 250 by executing the archive file (S515), and then executes the expanded backup program (S520).

Next, the authentication information selecting means 212 in the backup program 200 selects the "domain name", "read authentication information", "download communication method", "shared directory (for download)", "shared directory authentication information (download authentication information)", "FTP host name (for download)", "FTP authentication information (download authentication information)", "backup communication method", "shared directory (for backup)", "shared directory authentication information (backup destination authentication information)", "FTP host name (for backup)", and "FTP authentication information (backup destination authentication information)" which are associated with a device ID matches the device ID of the information processing device 130 concerned among a plurality of device IDs contained in the authentication information file 250, and stores the selected information in the preference setting file 260 (S525).

Next, the privileged invocation means 214 acquires the read identification information selected by the authentication information selecting means 212 from the preference setting file 260, causes the information processing device 130 to authenticate the read identification information and invoke the transfer means 220 in the privilege mode to obtain permission to read the target data 270 by the transfer means (S530). Next, the transfer means 220 acquires the "download communication method", "shared directory (for download)", "shared directory authentication information (download authentication information)", "FTP host name (for download)", and "FTP authentication information (download authentication information)" from the preference setting file 260 via the privileged invocation means 214, and then downloads the backup assist program from the data storing device 140 using the communication method specified by such information (S535). Then, the data storing device 140 receives a request from the information processing device 130 to send the backup assist program stored in the backup assist program storing section 152 to the information processing device 130 (S540).

Next, the backup destination authentication means 230 acquires the "backup communication method", "shared directory (for backup)", "shared directory authentication information (backup destination authentication information) ", "FTP host name (for backup)", and "FTP authentication information (backup destination authentication information)" from the preference setting file 260 via the privileged invocation means 214, and then send the backup destination identification information to the data storing device 140 using the communication method specified by the acquired information so that the backup destination identification information is authenticated to obtain permission to store the target data 270 in the storage device 150 (S545, S546).

Next, the transfer means 220 causes the information processing device 130 to read the target data 270 and transfer the device ID of the information processing device 130 to the data storing device 140 (S550). Next, data storing device 140 stores the target data sent by each of the one or more information processing devices 130 to the data storing device 140 in association with the device ID set in each information processing device 130 (S555).

Once the data storing device 140 stores the target data received from the information processing device 130 in the backup data storing section 154 in the storage device 150, the data storing device 140 sends a completion notification to the backup managing device 120, indicating that the backup processing for the information processing device 130 concerned has been completed (S560). Upon receiving the completion notification from the data storing device 140, the completion notifying section 126 in the backup managing device 120 stores completion log information indicating that the backup processing for the information processing device 130 concerned has been completed, in the completion log storing section 116. When all the target data transferred by each of the plurality of information processing devices 130 to the data storing device 140 has been stored in the backup data storing section 154 in the storage device 150, the completion notifying section 126 notifies the administrator of the information system 10 or the current system 100 that the target data has been completely backed up for all of the one or more information processing devices 130 (S565).

According to the information system 10 described above, the backup program sent to each information processing device 130 can run therein in the privilege mode to transfer the target data to the data storing device 140. Thus, even if the user of each information processing device 130 does not know how to manage the information processing device 130, the backup processing can be performed simply by invoking the received backup program without directly operating the information processing device 130 by the administrator. Therefore, the management cost for backup can be reduced.

Furthermore, the backup program executed on each information processing device 130 can select the read authentication information and other information corresponding to the information processing device 130 concerned, from the authentication information file, and perform the backup processing using the selected information. Thus, by preparing a single authentication information file in which various information on all the information processing devices 130 to be replaced is recorded, the administrator of the information system 10 or the current system 100 can perform the backup processing without preparing individual files for the respective information processing devices 130, which reduces the management costs.

The administrator of the information system 10 or the current system 100 can receive the completion notification when the backup processing has been completed for all the information processing devices 130 to be replaced. Thus, the administrator of the information system 10 or the current system 100 can replace the information processing device 130 with the information processing device 190 without delay after the backup processing has been completed.

In place of S500 and S505 described above, the backup function sending section 122 may cause the backup program sending section 123 to send the backup program to the information processing device 130 without sending the authentication information file. In this case, the backup program invoked on the information processing device 130 by its user in S510 requests the backup managing device 120 to send the authentication information file. In response to the request from the backup program, the authentication information sending section 124 sends the authentication information file to the backup program executed on the information processing device 130.

Figure 6:
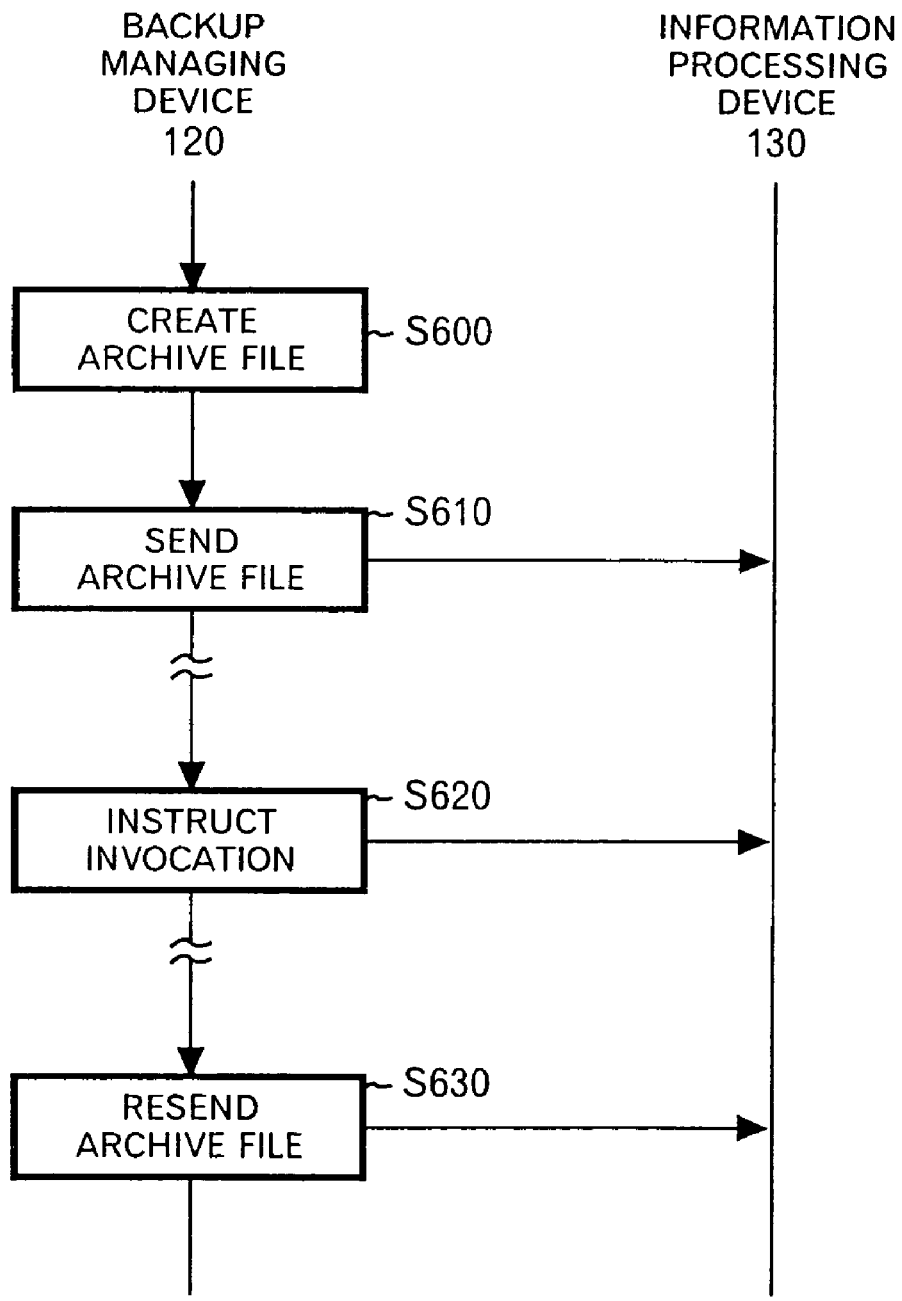
FIG. 6 shows a flow of backup prompt processing in the current system 100 according to the embodiment of the present invention.

FIG. 6 shows a flow of a backup prompt processing in the current system 100 according to the present embodiment. Since S600 and S610 are similar to S500 and S505 shown in FIG. 5, they will not be described further.

If the information processing device 130 has not sent the target data to the data storing device 140 even after a predetermined time has passed since the backup function sending section 122 sent the backup program to the information processing device 130, the invocation instructing section 128 provides the user of the information processing device 130 with a message instructing the invocation of the backup program (S620).

Also, if the information processing device 130 has not sent the target data to the data storing device 140 after a predetermined time has passed since the backup function sending section 122 sent the backup program to the information processing device 130, the backup function sending section 122 sends the archive file containing the backup program and the authentication information file to the information processing device 130 again (S630).

According to the backup prompt processing described above, the backup managing device 120 can prompt the user of the information processing device 130 that has not performed backup processing to invoke the backup program, by instructing the invocation of the backup program and/or resending the archive file. Thus, if the user of the information processing device 130 has forgotten to invoke the backup program, it is possible to reduce management cost for an operation of prompting the user.

Figure 7:
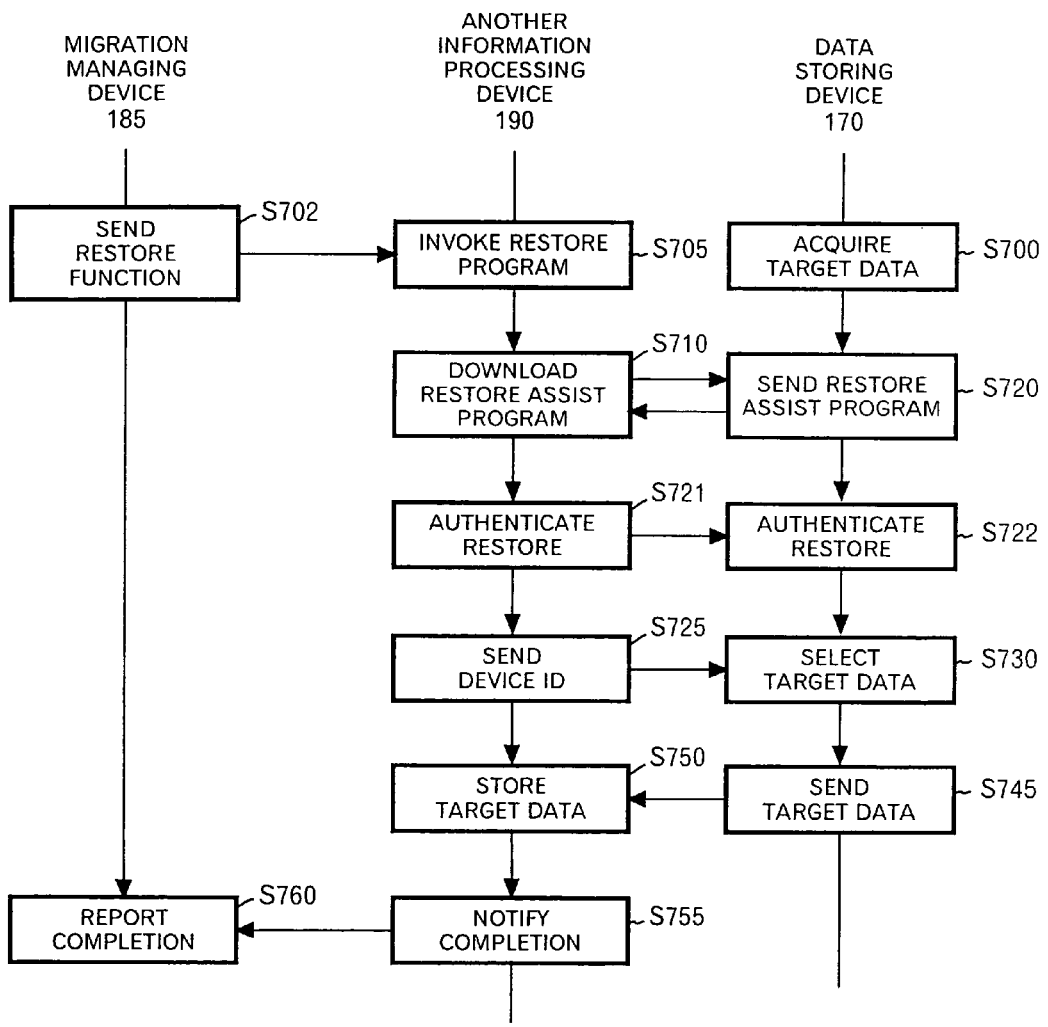
FIG. 7 shows a flow of restore processing in an update system 155 according to the embodiment of the present invention.

FIG. 7 shows a flow of restore processing in the update system 155 according to the present embodiment.

First, the data storing device 170 acquires target data of each information processing device 130 to be replaced, from the storage device 150 and stores it in the backup data storing section 164 in the storage device 160 (S700). The administrator of the information system 10 or the update system 155 stores the restore program in the restore program storing section 182, and also creates the authentication information file 450 and stores it in the write authentication information storing section 183. The administrator then instructs the migration managing device 185 to restore the target data in one or more information processing devices 190 replacing one or more information processing devices 130. Upon receiving the restore instruction, the restore function sending section 186 creates an archive file for restore containing the restore program and the authentication information file, and sends the archive file to each of the one or more information processing devices 190 (S702). In this case, the restore function sending section 186 may send the archive file by mail or the like. Alternatively, the restore program storing section 182 and the write authentication information storing section 183 may be made accessible as a shared directory to the administrator of the information processing device 190, and the restore program may be sent to the information processing device 190 when the administrator instructs to invoke the restore program.

The archive file sent to each information processing device 190 is invoked on that information processing device 190 by its user. The information processing device 190 expands the archive file to the restore program 400 and the authentication information file 450 by executing it, and then executes the expanded restore program 400 (S705).

When the restore program 400 is executed, the authentication information selecting means 412 in the restore program 400 selects a "domain name", "read authentication information", "download communication method", "shared directory (for download)", "shared directory authentication information (download authentication information)", "FTP host name (for download)", "FTP authentication information (download authentication information)", "restore communication method", "shared directory (for restore)", "shared directory authentication information (restore target authentication information)", "FTP host name (for restore)", and "FTP authentication information (restore target authentication information)" which are associated with a device ID matching the device ID of the information processing device 190 concerned among the plurality of device Ids contained in the authentication information file 450, and stores the selected information in the preference setting file 460.

Next, the privileged invocation means 414 acquires the write identification information selected by the authentication information selecting means 412 from the preference setting file 460, and obtains permission to write the target data 470 by the target data storing means 440 by causing the information processing device 190 to authenticate the write identification information and invoking the restore request means 420 and the target data storing means 440 in the privilege mode. Next, the restore request means 420 acquires the "download communication method", "shared directory (for download)", "shared directory authentication information (download authentication information)", "FTP host name (for download)", and "FTP authentication information (download authentication information)" from the preference setting file 460 via the privileged invocation means 414, and then downloads the restore assist program from the data storing device 170 using the communication method specified by such information (S710). At that time, the data storing device 170 sends the restore assist program stored in the restore assist program storing section 162 to the information processing device 190 in response to a request therefrom (S720).

Next, the restore request means 420 acquires the "restore communication method", "shared directory (for restore)", "shared directory authentication information (restore target authentication information)", "FTP host name (for restore)", and "FTP authentication information (restore target authentication information)" from the preference setting file 460 via the privileged invocation means 414, and obtains permission to acquire the target data from the data storing device 170 by sending the restore identification information to the data storing device 170 using the communication method specified by such information, for authentication of the restore identification information (S721, S722).

Next, the restore request means 420 sends the device ID of the information processing device 190 to the data storing device 170 to request restoring of the target data into the information processing device 190 (S725). If that device ID has been received from another information processing device 190 having the same device ID as that of the information processing device 130 to be replaced, the target data sending section 172 selects the target data stored in the backup data storing section 164 in association with that device ID (S730). The target data sending section 172 then cooperates with the target data storing means 440 executed on that information processing device 190 to store the selected target data in that information processing device 190 (S745, S750).

Once the target data storing means 440 completely stores the target data, the information processing device 190 sends a completion notification of the restore processing to the migration managing device 185 (S755). Upon receiving the completion notification, the completion notifying section 188 in the migration managing device 185 stores completion log information in the completion log storing section 184 indicating that the restore processing has been completed in that information processing device 190. Once the completion notification has been received from all of the one or more information processing devices 190 replacing the one or more information processing devices 130, the completion notifying section 188 notifies the administrator of the information system 10 or the update system 155 that the target data has been completely restored in all of the one or more information processing devices 190 (S760). In response to the notification in S760, the administrator of the information system 10 or the update system 155 delivers each of the one or more information processing devices 190 to the department where the information processing devices 130 to be replaced with the information processing devices 190 have been installed.

According to the information system 10 described above, the update system 155 can restore target data stored in an information processing device 130 into a new information processing device 190 before the information processing device 190 is delivered to a department where the information processing device 130 has been installed. Thus, the user of the information processing device 130 can replace the information processing device 130 with the new information processing device 190 immediately after the delivery thereof. As a result, the management cost for replacement and the downtime of the information processing device can be reduced.

Figure 8:
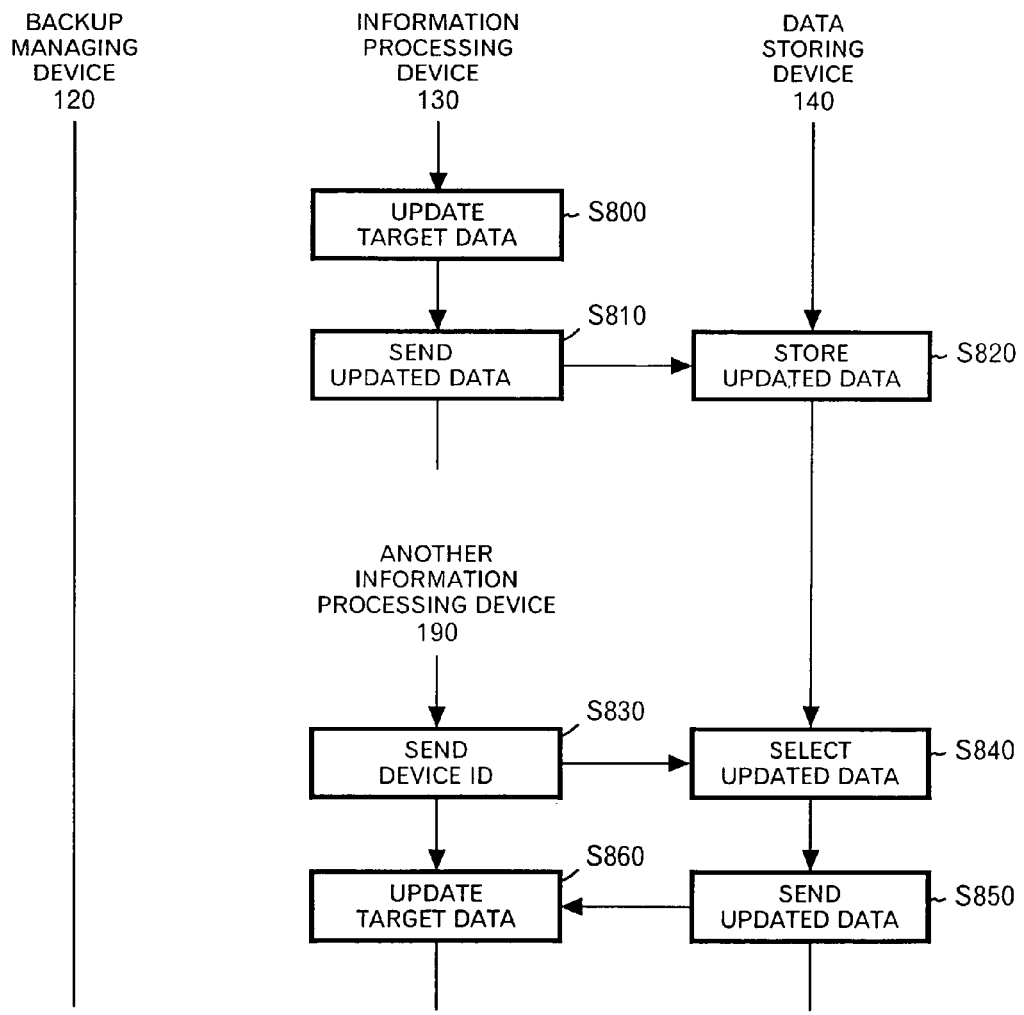
FIG. 8 shows a flow of update processing in the current system 100 according to the embodiment of the present invention.

FIG. 8 shows a flow of a update processing in the current system 100 according to the present embodiment.

In the information processing device 130 to be replaced, if the target data is updated after it was transferred to the data storing device 140 (S800), the update means 240 sends the updated target data to the data storing device 140 (S810). The data storing device 140 stores the updated data sent by that information processing device 130 in the backup data storing section 154 in association with the device ID of that information processing device 130 (S820).

Next, once that information processing device 130 is replaced with a new information processing device 190, the restore request means 420 in the restore program 400 executed on the information processing device 190 having replaced the information processing device 130 previously storing the target data sends the device ID of that information processing device 190 to the data storing device 140 (S830). Upon receiving the device ID from the information processing device 190, the updated data sending section 142 in the data storing device 140 sends the updated data stored in association with the device ID in S820, to the information processing device 190 (S850) to cause the target data storing means 440 executed on the information processing device 190 to update the target data 470 stored in the information processing device 190 (S860).

According to the target data update processing described above, even if the target data is updated on the information processing device 130 after it was backed up and before the information processing device 190 in which the target data was restored is delivered to a department where the information processing device 130 is located, the update in the target data can be reflected in the replacing information processing device 190. As a result, the management cost for replacement and in the downtime of the information processing device 130 can be reduced.

Figure 9:
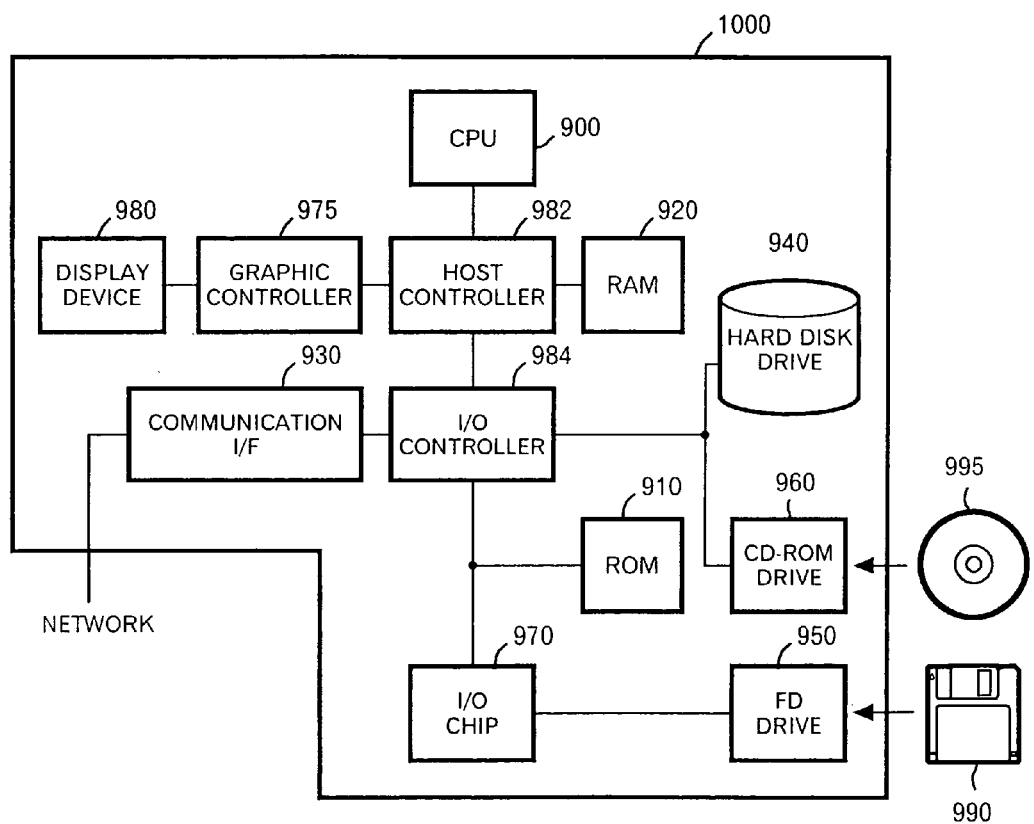
FIG. 9 shows an exemplary hardware configuration of a computer 1000 according to the embodiment of the present invention.

FIG. 9 shows an exemplary hardware configuration of a computer 1000 according to the present embodiment. The computer 1000 according to the present embodiment comprises a CPU-ralated section having a CPU 900, a RAM 920, a graphic controller 975, and a display device 980 which are interconnected by a host controller 982, an I/O section having a communication interface 930, a hard disk drive 940, and a CD-ROM drive 960 which are connected to the host controller 982 via an I/O controller 984, and a legacy I/O section having a ROM 910, a flexible disk drive 950, and an I/O chip 970 which are connected to the I/O controller 984.

The host controller 982 connects the RAM 920 to the CPU 900 and graphic controller 975, which access the RAM 920 at a high transfer rate. The CPU 900 operates based on the programs stored in the ROM 910 and RAM 920 to control each section. The graphic controller 975 acquires image data generated by the CPU 900 or other device. on a frame buffer provided in the RAM 920, to display it on the display device 980. Alternatively, the graphic controller 975 may include a frame buffer therein which stores image data generated by the CPU 900 or other device.

The I/O controller 984 connects the host controller 982 to the communication interface 930, hard disk drive 940, and CD-ROM drive 960 which are relatively fast I/O devices. The communication interface 930 communicates with other systems via a network. The hard disk drive 940 stores programs and data used by the CPU 900 in the computer 1000. The CD-ROM drive 960 reads a program or data from the CD-ROM 995 and provides it to the hard disk drive 940 via the RAM 920.

The I/O controller 984 is connected to the ROM 910 and to the flexible disk drive 950 and I/O chip 970 which are relatively slow I/O devices. The ROM 910 stores a boot program executed by the computer 1000 when it is started, hardware-dependent programs for the computer 1000, and other programs. The flexible disk drive 950 reads a program or data from a flexible disk 990 and provides it to the hard disk drive 940 via the RAM 920. The I/O chip 970 is connected to the flexible disk 990 and to various I/O devices via, for example, a parallel port, a serial port, a keyboard port, or a mouse port.

A program to be provided to the hard disk drive 940 via the RAM 920 is stored in a recording medium such as the flexible disk 990, the CD-ROM 995, or an IC card, and is provided by the user. The program is read from the recording medium and installed in the hard disk drive 940 in the computer 1000 via the RAM 920. The program is, thereafter, executed by the CPU 900.

A program installed and executed in the computer 1000 functioning as the backup managing device 120 comprises a backup function sending module including a backup program sending module and an authentication information sending module, a completion notifying module, and an invocation instructing module. The program and modules causes the computer 1000 to function as the backup function sending section 122 including the backup program sending section 123 and authentication information sending section 124, the completion notifying section 126, and the invocation instructing section 128, respectively.

A program installed and executed in the computer 1000 functioning as the data storing device 140 comprises an updated data sending module. The program and module cause the computer 1000 to function as the updated data sending section 142.

A program installed and executed in the computer 1000 functioning as the data storing device 170 comprises a target data sending module. The program and module cause the computer 1000 to function as the target data sending section 172.

A program installed and executed in the computer 1000 functioning as the migration managing device 185 comprises a restore function sending module and a completion notifying section. The program and modules cause the computer 1000 to function as the restore function data sending section 186 and the completion notifying section 188, respectively.

The programs or modules described above may be stored in an external storage medium. The storage medium may be, for example, the flexible disk 990, the CD-ROM 995, an optical recording medium such as a DVD or a PD, a magneto-optical recording medium such as an MD, a tape medium, or a semiconductor memory such as an IC card. Alternatively, a storage device such as a hard disk drive or a RAM provided in a server system connected to a private communication network or the Internet may be used as a recording medium to provide the programs to the computer 1000 via the network.

While the present invention has been described with reference to its embodiment, the technical scope of the present invention is not limited to that of the above embodiment. Various changes or improvements may be made to the above embodiment. It is obvious from the attached claims that aspects including such changes or improvements fall within the technical scope of the present invention.

For example, the information system 10 described above can be used for backup and restore not only when the information processing device 130 is replaced but also when the information processing device 130 continues to be used. In the latter case, the restore system may be connected to the information processing device 130, and the target data may be restored in the information processing device 130 instead of the information processing device 190.

In the drawings and specifications there has been set forth a preferred embodiment of the invention and, although specific terms are used, the description thus given uses terminology in a generic and descriptive sense only and not for purposes of limitation.

We claim as our invention:

1. A computer readable storage medium encoded with computer executable instructions for a backup system, the computer executable instructions causing a processor of an information processing device to execute the backup system, the backup system comprising:
    a backup program storing section that retains a backup program that transfers target data of the information processing device to the backup system when executed on the information processing device;
    a read authentication information storing section that retains an authentication information file that associates a device ID identifying each of a plurality of information processing devices permitting the backup program to read the target data stored therein;
    a backup function sender that is in communication with the backup program storing section and the read authentication information storing section and that transfers the backup program and the read authentication information to the information processing device;
    an invocation instructor that instructs a user of the information processing device to invoke the backup program when the target data is not transferred to the backup system from the information processing device after a predetermined period has passed since the backup function sender sent the backup program to the information processing device; and
    a backup data storing section that is accessible to the backup program and that retains the target data to be transferred to the backup system by the information processing device that has executed the backup program; wherein the computer executable instructions include:
    read authentication code that causes the processor of the information processor to obtain permission to read the target data from the information processing device by authenticating that the read authentication information sent to the information processing device is associated with one of a plurality of the device IDS contained in the authentication information file which matches a device ID set for that information processing device; and
    transfer code that causes the processor of the information processor to read the target data permitted to be read and transfer the target data to the backup system.

2. The backup system according to claim 1, wherein the backup function sender transfers the backup program and the read authentication information to the information processing device as an archive file in an executable form that is expanded to the backup program and the read authentication information to execute the backup program when executed on the information processing device.

3. The backup system according to claim 1, wherein the backup function sender includes:
    a backup program sending section that sends the backup program to the information processing device; and
    an authentication information sending section that sends the read authentication information to the backup program in response to a request from the backup program invoked on the information processing device.

4. The backup system according to claim 1, wherein the backup function sender transfers the backup program and the authentication information file to each of the plurality of information processing devices, the transfer code executed in each of the plurality of information processing devices causes that information processing device to read the target data permitted to be read and transfer the target data to the backup system, and the backup data storing section retains the target data transferred to the back-up system by each of the plurality of information processing devices having executed the backup program.

5. The backup system according to claim 1, wherein the read authentication information storing section further retains backup destination authentication information that causes the backup data storing section to permit the target data to be stored, the backup function sender transfers the backup program, the read authentication information, and the backup destination authentication information to the information processing device, and the backup program further has backup destination authentication means for causing the backup data storing section to authenticate the backup destination authentication information sent to the information processing device so as to obtain permission to store the target data in the backup data storing section.

6. The backup system according to claim 1, wherein the backup function sender transfers the backup program and the read authentication information to a plurality of information processing devices, the backup data storing section retains the target data to be transferred to the backup system by the respective information processing devices that have executed the backup program, and the backup system further comprises a completion notifier which informs an administrator of the backup system that the target data has been completely backed up for all of the plurality of information processing devices when the backup data storing section has stored all the target data to be transferred to the backup system by each of the plurality of information processing devices.

7. The backup system according to claim 1 wherein the backup function sender transfers the backup program and the authentication information to the information processing device again if the target data is not transferred to the backup system from the information processing device after a predetermined period has passed since the backup function sender sent the backup program to the information processing device.

8. The backup system according to claim 1, wherein the backup data storing section retains the target data that the information processing device transferred to the backup system, in association with a device ID set for the information processing device, and the backup system further comprises a target data sender that sends, upon receiving a device ID from another information processing device for which the same device ID as that for the information processing device has been set, the target data stored in association with the device ID to the another information processing device to cause the another information processing device to store the target data.

9. The backup system according to claim 8, wherein the backup program further includes update code for causing, if the target data is updated on the information processing device after being transferred by the transfer code to the backup system, the information processing device to read updated data that is an updated portion of the target data and to transfer the updated data to the backup system, the backup data storing section further retains the updated data in association with the device ID, and the backup system further comprises an updated data sending section for further sending, upon receiving the device ID from the another information processing device replacing the information processing device storing the target data, the updated data stored in association with the device ID to the another information processing device to update the target data stored in the another information processing device.

10. A backup method comprising:
storing a backup program to be executed on an information processing device to transfer information-processing-device target data to a provided computer system;
storing a read authentication information file associating a device ID identifying each of a plurality of information processing devices permitting the backup program to read the target data stored therein;
a backup function sending step of sending the backup program and the read authentication information to the information processing device;
obtaining permission to read the target data from the information processing device by authenticating that the read authentication information sent to the information processing device is associated with one of a plurality of the device IDs contained in the authentication information file which matches a device ID set for that information processing device;
reading the target data permitted to be read and transferring the target data to the computer system;
communicating a message that instructs a user of the information processing device to invoke the backup program when the target data is not transferred to the backup system from the information processing device after a predetermined period has passed since the backup function sender sent the backup program to the information processing device; and storing the target data to be transferred to the computer system by the information processing device which has executed the backup program; and
wherein the backup function sending step transfers the backup program and the read authentication information to the information processing device as an archive file in an executable form that is expanded to the backup program and the read authentication information to execute the backup program when executed on the information processing device.

11. A product comprising a computer readable storage medium having a backup program stored therein for backing up target data stored in an information processing device, wherein the backup program is sent from a managing device for managing the information processing device to the information processing device and invoked on the information processing device, the backup program including:

read authentication code that obtains permission to read the target data from the information processing device by authenticating that the read authentication information sent to the information processing device is associated with one of a plurality of the device IDs of each of a plurality of information processing devices permitting the backup program to read target data stored within;
communication code that instructs a user of the information processing device to invoke the backup program when the target data is not transferred to the backup system from the information processing device after a predetermined period has passed since the backup function sender sent the backup program to the information processing device; and
transfer code that causes the information processing device to read the target data permitted to be read and transfers the target data to a storage device for storing the target data; and
wherein the managing device transfers the backup program and the read authentication information to the information processing device as an archive file in an executable form that is expanded to the backup program and the read authentication information to execute the backup program when executed on the information processing device.

12. A restore system comprising:
a restore program storing section that retains a restore program to be executed on an information processing device to cause the information processing device to store target data received from the restore system;
a write authentication information storing section that retains write authentication information that causes the information processing device to permit writing of the target data by the restore program;
a restore function sender that is in communication with the restore program storing section and the write authentication information storing section and that transfers the restore program and the write authentication information to the information processing device;
an invocation instructor that communicates a message that instructs a user of the information processing device to invoke the restore program when the target data is not received from the backup system by the information processing device after a predetermined period has passed since the restore function sender sent the restore program to the information processing device; and
a target data sender that operates under the control of the restore program and that transfers the target data to the information processing device that has executed the restore program; wherein the restore program includes:
write authentication code that obtains permission to write the target data in the information processing device by causing the information processing device to authenticate the write authentication information sent to the information processing device; and
target data storing code that causes the information processing device to store the target data received from the target data sender.

13. The backup method according to claim 10, further comprising:
storing a restore program to be executed on an information processing device to cause the information processing device to store target data in the information processing device that is received from a computer system;
storing write authentication information for causing the information processing device to permit writing of the target data by the restore program;

sending the restore program and the write authentication information to the information processing device;

communicating a message that instructs a user of the information processing device to invoke the restore program when the target data is not received from the backup system by the information processing device after a predetermined period has passed since the restore function sender sent the restore program to the information processing device; and sending the target data to the information processing device that has executed the restore program; the restore program, when invoked on the information processing device by a user of the information processing device, being effective to:

obtain permission to write the target data in the information processing device by causing the information processing device to authenticate the write authentication information sent to the information processing device; and causing the information processing device to store the target data received at said sending of target data.

14. The product of claim 11, the computer readable storage medium further comprising a restore program stored therein for restoring target data in an information processing device, wherein the restore program is sent from a managing device for managing the information processing device to the information processing device and invoked on the information processing device, wherein the invocation is approvable by an administrator of the information processing device, the restore program including:

write authentication code for obtaining permission to write the target data in the information processing device by causing the information processing device to authenticate write authentication information sent from the managing device to the information processing device to cause the information processing device to permit writing of the target data by the restore program;

communication code that instructs a user of the information processing device to invoke the restore program when the target data is not received from the backup system by the information processing device after a predetermined period has passed since the restore function sender sent the restore program to the information processing device; and target data storing code for causing the information processing device to store the target data received from a storage device storing the target data.

15. A computer readable storage medium encoded with computer executable instructions for a migration system, the computer executable instructions causing a processor of a first information processing device to execute the migration system, comprising:

a backup program storing section that retains a backup program that transfers target data of the first information processing device to the migration system when executed on the information processing device;

a read authentication information storing section that retains an authentication information file that associates a device ID identifying each of a plurality of information processing devices permitting the backup program to read the target data stored therein;

a backup function sender that is coupled to the backup program storing section and the read authentication information storing section and that transfers the backup program and the read authentication information to the first information processing device;

a backup data storing section that is accessible to the backup program and that retains the target data to be transferred to the migration system by the first information processing device that has executed the backup program;

an invocation instructor that communicates a message that instructs a user of the information processing device to invoke the backup program when the target data is not transferred from the migration system to the information processing device after a predetermined period has passed since the backup function sender sent the backup program to the information processing device; and a target data sender that operates under the control of the backup program and that transfers the target data to another information processing device; wherein the computer executable instructions include:

read authentication code that causes the processor of the first information processing device to obtain permission to read the target data by authenticating that the read authentication information sent to the information processing device is associated with one of a plurality of the device IDs contained in the authentication information file which matches a device ID set for that information processing device; and transfer code that causes the first information processing device to read the target data permitted to be read and transfer the target data to the migration system.

16. A migration method for migrating target data stored in one information processing device to another information processing device by means of a computer system, the migration method comprising:

storing a backup program to be executed on the one information processing device to transfer the target data to the computer system;

storing read authentication information file that associates a device ID identifying each of a plurality of information processing devices permitting the backup program to read the target data stored therein;

sending the backup program and the read authentication information to the one information processing device;

storing the target data to be transferred to the computer system by the one information processing device that has executed the backup program;

communicating a message that instructs a user of the information processing device to invoke the backup program when the target data is not transferred from the migration system to the information processing device after a predetermined period has passed since the backup function sender sent the backup program to the information processing device; and sending the target data to the another information processing device; wherein the backup program is invoked on the one information processing device by a user of the one information processing device, and comprises:

read authentication code that obtains permission to read the target data from the one information processing device by authenticating that the read authentication information sent to the information processing device is associated with one of a plurality of the device IDs contained in the authentication information file which matches a device ID set for that information processing device; and transfer code that causes the one information processing device to read the target data permitted to be read and transfers the target data to the computer system.

* * * * *